Jan. 17, 1939. J. C. SCHUMACHER 2,144,433
PURIFICATION OF BENZOQUINONE
Filed April 22, 1937
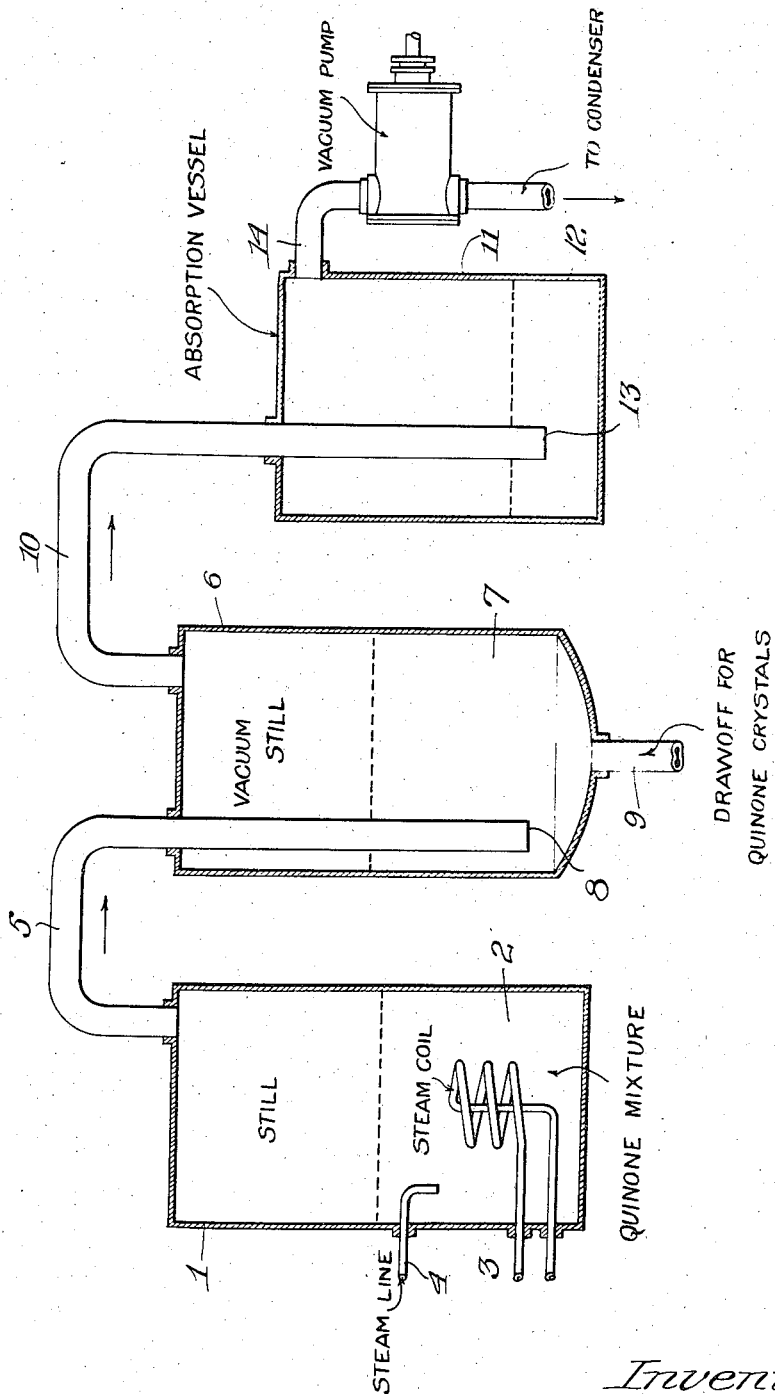
Inventor:
Joseph C. Schumacher,
By Chritton, Wiles, Davies, Hirsch & Dawson,
Attys.

Patented Jan. 17, 1939

2,144,433

UNITED STATES PATENT OFFICE 2,144,433

PURIFICATION OF BENZOQUINONE

Joseph C. Schumacher, La Salle, Ill., assignor to Carus Chemical Company, a corporation of Illinois Application April 22, 1937, Serial No. 138,466

5 Claims. (Cl. 260—396)

This invention relates to a method of preparing benzoquinone and more particularly to a method of distilling the same from an aqueous mass containing it.

The usual method of preparing benzoquinone is to oxidize aniline sulfate with manganese dioxide and sulfuric acid. The isolation of quinone from this mixture presents many problems. Extraction with organic solvents is very impractical because an emulsion forms when the solvent is agitated with the quinone mixture. The quinone can be removed from the mixture by steam distillation under reduced pressure to prevent decomposition of the quinone, but the condensation of the vapors is difficult. In a condenser the quinone condenses on the cooling surface and forms an insulating layer. This cuts down the efficiency of the cooling so greatly that it is entirely impractical. If a liquid condenser with immersed cooling coils is used the same trouble is encountered as soon as the solution becomes saturated. Organic solvents in which quinone is easily soluble are sometimes used to prevent this trouble, but the great loss of solvent through the vacuum pump leaves the situation with much to be desired.

It has now been discovered that these difficulties may be avoided by passing quinone vapors through a boiling solution of water at a temperature below 40° C. and then removing the quinone from the vapors in an absorption medium. The effectiveness of such an intermediate aqueous bath is apparently due to the extraordinary fact that the ratio of quinone vapor to steam changes markedly within a short range of temperature. Thus it has been discovered that whereas the ratio of quinone to water vapor at 65° C. is approximately 8.3 parts water to 1 part quinone, at 30° C. it is about 22½ to 1, and at 23° approximately 30.5 parts to one of quinone.

The invention is illustrated diagrammatically in the drawing, in which the quinone mixture 2 is introduced into the still 1, where it is heated by a steam coil 3 and by live steam through the line 4. Vapors pass through the vapor line 5 into the vacuum still 6 containing a supply of water 7 below which the end 8 of the vapor line dips to a considerable depth. A draw-off 9 is provided at the bottom of this still for the removal of quinone crystals. Vapors from the vacuum still pass through the line 10 into the absorption vessel 11 containing an absorption bath 12, preferably of hydroquinone. The end 13 of the vapor line 10 dips slightly below the surface of the hydroquinone. This vessel is connected by the line 14 to a condenser and vacuum pump (not shown).

In carrying out the process, a quinone mixture is produced in the still 1. For example, a reaction mixture of 80 parts aniline, 410 parts sulfuric acid, 220 parts 85% manganese dioxide, and 560 parts water may be stirred at 5° to 10° C. After the reaction has been substantially completed, the reaction mixture is heated to a temperature above 50° C. and preferably of the order of 60-65° C. and sufficient vacuum is produced within the still to boil the mixture at this temperature.

Vapor carrying quinone and water in the ratio of 1 part quinone to 8.3 parts water passes through the vapor line 5 into the vacuum still 6, which is maintained at a temperature of below 40° C. This differential may be accomplished by having the vapor line dip sufficiently below the liquid level in the vacuum still to produce a difference in pressure between the two stills of 5″ to 6″ of mercury. This difference will produce a boiling point of the order of 30° C. in the second still.

For example the quinone and water vapor were condensed at a temperature of 31° C. and reboiled at the same temperature. The vapors passing from the vacuum still had a ratio of quinone to water of about 1 to 22½.

These vapors were then passed into the absorption vessel 11 containing a hydroquinone solution. Preferably the vapor line 10 dips only slightly below the surface, for example, 6″ below it. The vapor pressure of quinone from such a solution was so low that no appreciable quantities were carried into the condenser.

Other ranges of temperature may be employed, but it is preferred that the quinone be vaporized above 50° C. and condensed below 40° C. in the intermediate condenser.

The absorption vessel may contain other absorption mediums than hydroquinone.

The quinone quickly saturates the water in the vacuum still 6 and begins to crystallize out. If desired, the crystals can be withdrawn by suction from time to time. Likewise water may be added from time to time to the vacuum still, but ordinarily this is not required.

What I claim as new and desire to secure by Letters Patent is:

1. The process of distilling quinone, which comprises volatilizing quinone with steam at atmospheric pressures at a temperature below 100° C., and then further lowering the temperature and pressure of the vapors in the absence of a quinone solvent and in a separate zone, whereby quinone is separated from the vapors without the separation of water therefrom.

2. The process of treating quinone which comprises distilling quinone from water containing it, with steam, at a temperature above 50° C. and below the decomposition temperature of quinone, introducing distilled quinone vapors into boiling water at a temperature below 40° C., and introducing vapors therefrom into a residual quinone absorption medium.

3. The method as set forth in claim 2 in which the first solution is maintained at a temperature of the order of 65° C. and the second solution is maintained at a temperature of the order of 30° C.

4. The process which comprises vaporizing quinone with steam from an aqueous mixture containing it and at a temperature below the decomposition temperature of quinone, and passing the mixed quinone and water vapors into boiling water at a temperature and pressure substantially lower than the first vaporizing temperature, condensing most of the quinone therein, and removing the resulting quinone crystals from the water.

5. The method as set forth in claim 4 in which the vapors from the second water solution are passed into a residual quinone absorption medium.

JOSEPH C. SCHUMACHER.